(12) United States Patent
Chen (10) Patent No.: US 8,407,390 B2
(45) Date of Patent: Mar. 26, 2013

(54) METHOD AND APPARATUS FOR DATA PROCESSING

(75) Inventor: Xingwen Chen, Beijing (CN)

(73) Assignees: Lenovo (Beijing) Limited (CN); Beijing Lenovo Software Ltd. (CN)

( * ) Notice: Subject to any disclaimer, the term of this patent is extended or adjusted under 35 U.S.C. 154(b) by 990 days.

(21) Appl. No.: 12/317,479

(22) Filed: Dec. 23, 2008

(65) Prior Publication Data

US 2009/0177780 A1 Jul. 9, 2009

(30) Foreign Application Priority Data

Dec. 29, 2007 (CN) .......................... 2007 1 03084992

(51) Int. Cl.
*G06F 13/00* (2006.01)
*G06F 3/00* (2006.01)
(52) U.S. Cl. .......................... 710/316; 710/38; 710/110
(58) Field of Classification Search .............. 710/31, 710/38, 107, 110, 305, 306, 300, 316
See application file for complete search history.

(56) References Cited

U.S. PATENT DOCUMENTS

| | | | | | |
|---|---|---|---|---|---|
| 5,774,637 | A | * | 6/1998 | Haber et al. ................. | 358/1.15 |
| 5,809,262 | A | * | 9/1998 | Potter ........................... | 710/305 |
| 5,968,185 | A | * | 10/1999 | Bressoud et al. ............. | 714/10 |
| 6,055,362 | A | * | 4/2000 | Kesner et al. ................ | 714/1 |
| 6,159,150 | A | * | 12/2000 | Yale et al. .................... | 600/437 |
| 6,735,663 | B2 | * | 5/2004 | Watts et al. .................. | 710/313 |
| 6,816,925 | B2 | * | 11/2004 | Watts, Jr. .................... | 710/36 |
| 6,868,468 | B2 | * | 3/2005 | Boz et al. ..................... | 710/304 |
| 6,931,474 | B1 | * | 8/2005 | Ginosar ........................ | 710/316 |
| 7,120,820 | B2 | * | 10/2006 | Lehmann ...................... | 714/4.1 |
| 7,152,171 | B2 | * | 12/2006 | Chandley et al. ............ | 713/320 |
| 7,263,331 | B2 | * | 8/2007 | Gupta et al. ................. | 455/41.2 |
| 7,275,167 | B2 | | 9/2007 | Chandley et al. | |
| 7,360,010 | B2 | * | 4/2008 | Ghaffari et al. .............. | 710/316 |
| 7,529,861 | B2 | * | 5/2009 | Ohta et al. .................... | 710/8 |
| 7,724,686 | B2 | * | 5/2010 | Maekawa et al. ............ | 370/252 |
| 8,051,326 | B2 | * | 11/2011 | Chen ............................. | 714/13 |
| 2002/0099899 | A1 | * | 7/2002 | Shaw ............................ | 710/316 |

FOREIGN PATENT DOCUMENTS

CN 1694086 A 11/2005

* cited by examiner

*Primary Examiner* — Paul R Myers
*Assistant Examiner* — Trisha Vu
(74) *Attorney, Agent, or Firm* — Schwegman Lundberg & Woessner, P.A.

(57) ABSTRACT

According to the present invention, a method and apparatus for data processing is provided for a data processing device comprising an auxiliary execution system, a main execution system, a switch unit and a networking unit. The method and apparatus according to the present invention are capable of establishing a networking data channel between the auxiliary execution system, the switch unit and the networking unit based on a first control instruction for the switch unit; or of establishing a networking data channel between the main execution system, the switch unit and the networking unit based on a second control instruction for the switch unit. In this way, the realization of always online can be guaranteed, and apparently, the user satisfaction can be effectively improved.

10 Claims, 9 Drawing Sheets

METHOD AND APPARATUS FOR DATA PROCESSING

RELATED APPLICATIONS

This application claims the benefit of priority, under 35 U.S.C. Section 119, to Chinese Patent Application Serial No. 200710308499.2, filed on Dec. 29, 2007, which is incorporated herein by reference in its entirety.

BACKGROUND OF THE INVENTION

1. Field of Invention

The present invention relates to computer technology, particularly to a method and apparatus for data processing.

2. Description of Prior Art

Currently, no operations can be performed by a computer in a state of off-work, even very simple online operations, such as viewing emails and contacts. The incapability of a computer in a state of off-work to perform online operations rejects the possibility of achieving always online for a user, which significantly degrades the user satisfaction.

SUMMARY OF THE INVENTION

In view of this, the object of the present invention is to provide a method and apparatus for data processing, which is capable of achieving always online for a computer in both states of booted and non-booted. Thereby the user satisfaction can be improved.

To achieve the object mentioned above, the technical solutions of the present invention are described hereafter.

A method for data processing, used in a data processing device comprising an auxiliary execution system, a main execution system, a switch unit and a networking unit, comprising:
  establishing a networking data channel between the auxiliary execution system, the switch unit and the networking unit based on a first control instruction for the switch unit; or
  establishing a networking data channel between the main execution system, the switch unit and the networking unit based on a second control instruction for the switch unit.

Establishing a networking data channel between the auxiliary execution system, the switch unit and the networking unit based on the first control instruction for the switch unit comprises:
  disconnecting a path previously connected from the networking unit to the main execution system, and arranging the path into the open section of a primary device path between the auxiliary execution system and the networking unit;
  transmitting from the main execution system to the auxiliary execution system a online control switching instruction;
  confirming, by the auxiliary execution system, the ownership of the online control of the main execution system once receiving the online control switching instruction; and
  switching, by the auxiliary execution system, a secondary device path which is previously connected from the auxiliary execution system to the networking unit, to the primary device path.

According to the above method, establishing a networking data channel between the auxiliary execution system, the switch unit and the networking unit based on the first control instruction for the switch unit further comprises synchronizing the results of the online operation in the main execution system into the auxiliary execution system.

Establishing a networking data channel between the main execution system, the switch unit and the networking unit based on the second control instruction for the switch unit comprises:
  disconnecting the path previously arranged into the open section of the primary
  device path between the auxiliary execution system and the networking unit, and arranging the path of the open section into the section between the main execution system and the networking unit;
  transmitting from the main execution system to the auxiliary execution system a online control switching instruction;
  confirming, by the auxiliary execution system, the lost of ownership of the online control of the main execution system once receiving the online control switching instruction; and
  switching, by the auxiliary execution system, the primary device path which is previously connected from the auxiliary execution system to the networking unit, to the secondary device path.

According to the above method, establishing a networking data channel between the main execution system, the switch unit and the networking unit based on the second control instruction for the switch unit further comprises synchronizing the results of the online operation in the auxiliary execution system into the auxiliary execution system.

An apparatus for data processing, comprising:
  an auxiliary execution system;
  a main execution system connected to the auxiliary execution system;
  a switch unit connected to the main execution system and the auxiliary execution system, respectively; and
  a networking unit connected to the switch unit, by which the main execution system and the auxiliary execution system connect to a network,
wherein
  a networking data channel between the auxiliary execution system, the switch unit and the networking unit is established based on a first control instruction for the switch unit; or
  a networking data channel between the main execution system, the switch unit and the networking unit is established based on a second control instruction for the switch unit.

The main execution system comprises an embedded controller EC connected to the networking unit and a south bridge chip ICH; the auxiliary execution system comprises an application processor AP and a universal serial bus (USB) switch unit, in which:
  the EC is used to notify the switch unit to perform the switching of online control, and to transmit the online control switching instruction to the AP;
  the switch unit is used to disconnect the path previously arranged into the open section of the primary device path between the AP and the networking unit, and arranging the path of the open section into the section between the ICH and the networking unit;
  the AP is used to confirm the lost of ownership of the online control of the main execution system once receiving the online control switching instruction, and to notify the USB switch unit to perform the switching of online control; and the USB switch unit is used to switch the primary device path, which previously connected from the AP to the networking unit, to the secondary device path.

According to the above apparatus, the switch unit is further used to disconnect the path previously connected from the networking unit to the ICH, and arranging the path into the open section of a primary device path between the AP and the networking unit; and the USB switch unit is further used to switch the secondary device path, which previously connected from the AP to the networking unit, to the primary device path.

According to the above apparatus, the AP comprises a USB interfaces as a primary device interface, and a USB interfaces as a secondary device interface, the primary device path being led out from the USB interface1, the secondary device path being led out from the USB interface0, and the USB switch unit comprises universal serial bus switch, USB SW1 and USB SW2, which are connected to each other; or the AP comprises a USB interface1 and a USB interface2 as a primary device interfaces, and a USB interface0 as a secondary device interface, the primary device path being led out from the USB interface1 and the USB interface2, the secondary device path being led out from the USB interface0, and the USB switch unit comprises universal serial bus switch, USB SW1 and USB SW2, which are connected to each other; or the AP comprises a USB interfaces as a primary/secondary device interface, and a USB interface1 as a primary device interface, the primary device path being led out from the USB interface3 which serves as a primary device interface, the secondary device path being led out from the USB interface3 which serves as a secondary device interface, wherein the AP is further used to confirm an online operation unit connected via the USB interface1 to be unavailable when the USB interfaces serves as a secondary device interface, or to confirm an online operation unit connected via the USB interface1 to be available when the USB interface3 serves as a primary device interface.

The networking unit comprises at least one of a wireless wide area network element and a Bluetooth element.

As can be seen, a method and apparatus for data processing is provided for a data processing device comprising an auxiliary execution system, a main execution system, a switch unit and a networking unit. The method and apparatus according to the present invention are capable of establishing a networking data channel between the auxiliary execution system, the switch unit and the networking unit based on a first control instruction for the switch unit; or of establishing a networking data channel between the main execution system, the switch unit and the networking unit based on a second control instruction for the switch unit. In this way, the realization of always online can be guaranteed, and apparently, the user satisfaction can be effectively improved.

DETAILED DESCRIPTION OF PREFERRED EMBODIMENTS

In the following, the technology of the present invention will be detailed with reference to the drawings.

A method for data processing is provided for a data processing device comprising an auxiliary execution system, a main execution system, a switch unit and a networking unit. The method comprises: establishing a networking data channel between the auxiliary execution system, the switch unit and the networking unit based on a first control instruction for the switch unit; or establishing a networking data channel between the main execution system, the switch unit and the networking unit based on a second control instruction for the switch unit.

An apparatus for data processing is provide, comprising: an auxiliary execution system; a main execution system connected to the auxiliary execution system; a switch unit connected to the main execution system and the auxiliary execution system, respectively; and a networking unit connected to the switch unit, by which the main execution system and the auxiliary execution system connect to a network, wherein a networking data channel between the auxiliary execution system, the switch unit and the networking unit is established based on a first control instruction for the switch unit; or a networking data channel between the main execution system, the switch unit and the networking unit is established based on a second control instruction for the switch unit.

Figure 1:
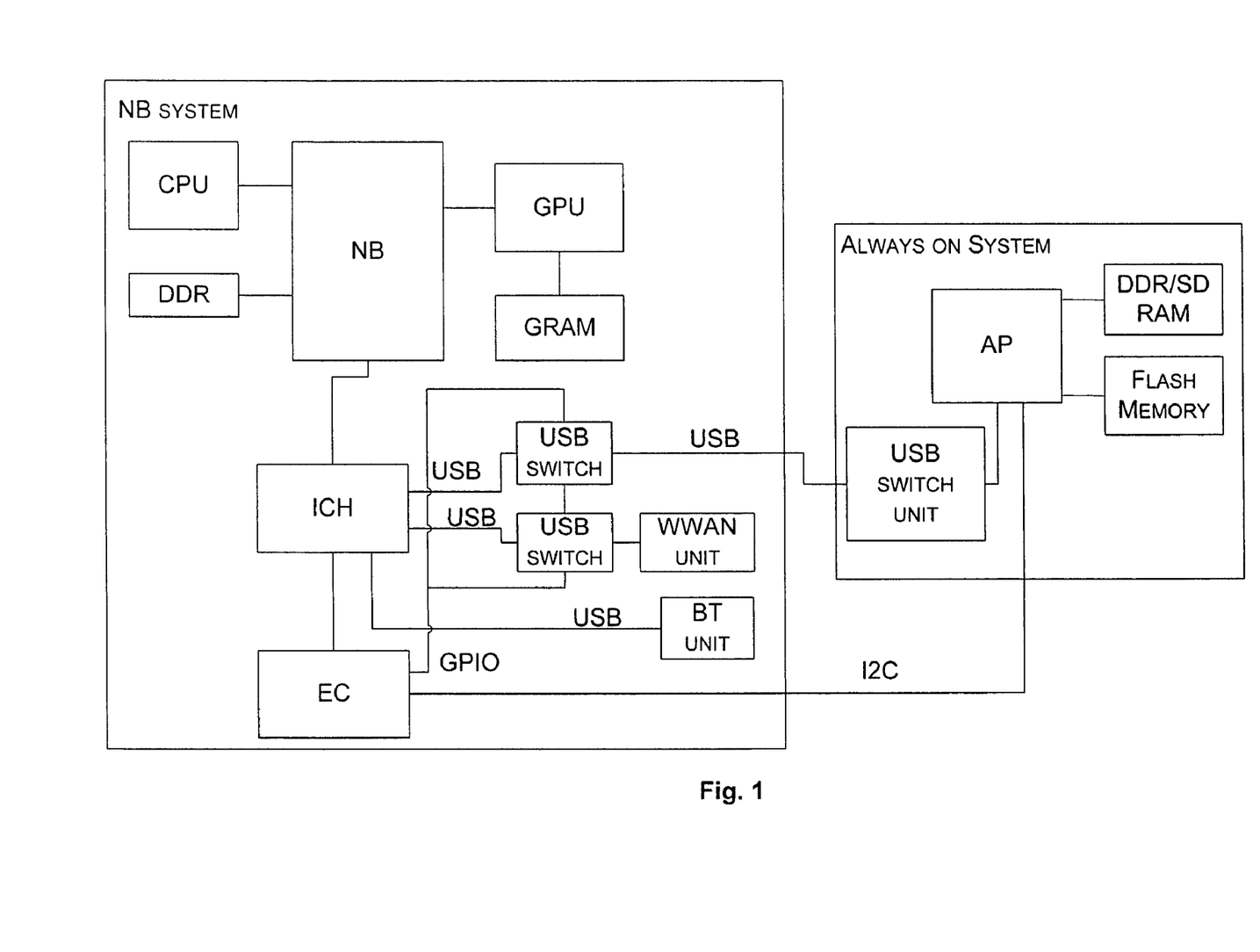
FIG. 1 is a diagram of the apparatus for achieving always online operation according to the first embodiment of the present invention.

Now referring to FIG. 1, a diagram of the apparatus for achieving always online operation is shown according to the first embodiment of the present invention. In FIG. 1, in addition to a North Bridge (NB) chip, an ICH and an EC which are sequentially connected to each other and currently arranged in the computer, there are an online control switching unit and an auxiliary execution system, i.e., Always on System newly arranged.

In particular, the online control switching unit can be arranged in the NB system of the computer. The online control switching unit generally consists of unlimited number of connected USB switches (also referred to as USB SW) and connects between the ICH and the Always on System. The Always on System comprises an AP, a USB switch unit connected between the AP and the online control switching unit, a Double Data Rate RAM/Synchronous Dynamic RAM (DDR/SDRAM) connected to the AP and a Flash Memory.

Moreover, the EC is connected to the online control switching unit and the AP, respectively. The ICH is connected to an online operation unit (also referred to as networking unit) either directly or via the online control switching unit. The online operation unit is a unit for online communication, such as Wireless Wide Area Network (WWAN) unit and Bluetooth (BT) unit, etc.

It is noted that there is a power supply module (not shown) arranged in the computer, for supplying the NB system, the online control switching unit and the Always on System.

In practice, the EC can notify the AP to perform data synchronization via a General Purpose Input/Output (GPIO) when the computer is to be switched to the off-work state. After receiving the data synchronization notification from the EC, the AP acquires an online operation result from the memory, for example the DDR, of the computer, and transmits the acquired result to the memory device, for example the Flash Memory, of the Always on System for storage.

Of course, it is also possible that the ICH notifies the AP to perform data synchronization via a USB connection. After receiving the data synchronization notification from the ICH, the AP acquires an online operation result from the memory, for example the DDR, of the computer, and transmits the acquired result to the memory device, for example the Flash Memory, of the Always on System for storage.

When the computer is in the off-work state, the power supply module keeps supplying the EC which switches the online control to the AP of the Always on System in a way that will be detailed in the following. The EC notifies, via the GPIO interface, the online control switching unit to perform the switching of the online control. Based on the received notification, the online control switching unit then disconnects the path previously connected from the online operation unit to the ICH, and arranges the path into the open section of the primary device path between the AP and the online operation unit. The EC also transmits an online control switching instruction to the AP via connections such as a dual-line serial bus (I2C). The AP confirms its ownership of the online control of the computer once receiving the online control switching instruction. Further, the AP notifies the USB switch unit to perform the switching of the online control via the GPIO interface. The USB switch unit then switches the secondary device path previously connected from the AP to the online operation unit to the primary device path based on the received notification.

After the online control of the computer is switched to the AP of the Always on System, the AP can control the online operation unit and manage the online operation for the computer. Furthermore, the AP can also transmit the result of the online operation to the memory device, for example the Flash Memory, for storage.

The computer may be switched to the on-work state from the off-work state as the computer is booted or for other reasons. During the switching of the computer from the on-work state to the off-work state, the AP can notify the EC to perform data synchronization via the GPIO interface. After receiving the data synchronization notification from the AP, the EC acquires an online operation result from the memory, for example the Flash Memory, of the Always on System, and transmits the acquired result to the memory device, for example the DDR, of the NB system in the computer for storage.

Of course, it is also possible that the AP notifies the ICH to perform data synchronization via a USB connection. After receiving the data synchronization notification from the AP, the ICH acquires an online operation result from the memory, for example the Flash Memory, of the Always on System, and transmits the acquired result to the memory device, for example the DDR, of the NB system in the computer for storage.

When the computer is finally in the on-work state, the online control of the computer is switched to the EC in a way that is detailed in the following. For example, the EC notifies, via the GPIO interface, the online control switching unit to perform the switching of the online control. Based on the received notification, the online control switching unit then disconnects the path previously arranged into the open section of the primary device path between the AP and the online operation unit, and arranges the path of the open section into the section between the ICH and the online operation unit. The EC also transmits an online control switching instruction to the AP via connections such as I2C. The AP confirms the lost of the ownership of the online control of the computer once receiving the online control switching instruction. Further, the AP notifies the USB switch unit to perform the switching of the online control via the GPIO interface. The USB switch unit then switches the primary device path previously connected from the AP to the online operation unit to the secondary device path based on the received notification.

After the online control of the computer is switched to the EC, the EC can control the online operation unit and manage the online operation for the computer. Furthermore, the EC can also transmit the result of the online operation to the memory device, for example the DDR, for storage.

In practice, it is not necessary that the switching of the online control is triggered by the computer itself, but may also be triggered by any other devices which are capable of detecting the change of the state of the computer, such as the AP.

As can be taken from the description of FIG. 1, since an auxiliary execution system is set up to take the place of the computer to perform the online control, the online control can be switched to the auxiliary execution system when the computer is switched from on-work state to off-work state. The auxiliary execution system then takes the responsibility for the management of the online operation. The online control can be switched back to the computer when the computer is switched from off-work state to on-work state. The computer thus takes the responsibility for the management of the online operation. In this way, it can be guaranteed that it is not necessary for the user to spend a long time waiting the computer to start; instead, the user can perform the online operation for the computer on time. And apparently, the user satisfaction can be effectively improved.

The apparatus of FIG. 1 has different structures and switching states when performing the switching of the online control, as shown in FIG. 2 to FIG. 7. In the following, the details for FIG. 2 to FIG. 7 will be described, in which only critical components for achieving the switching of online control are referred to.

Figure 2:
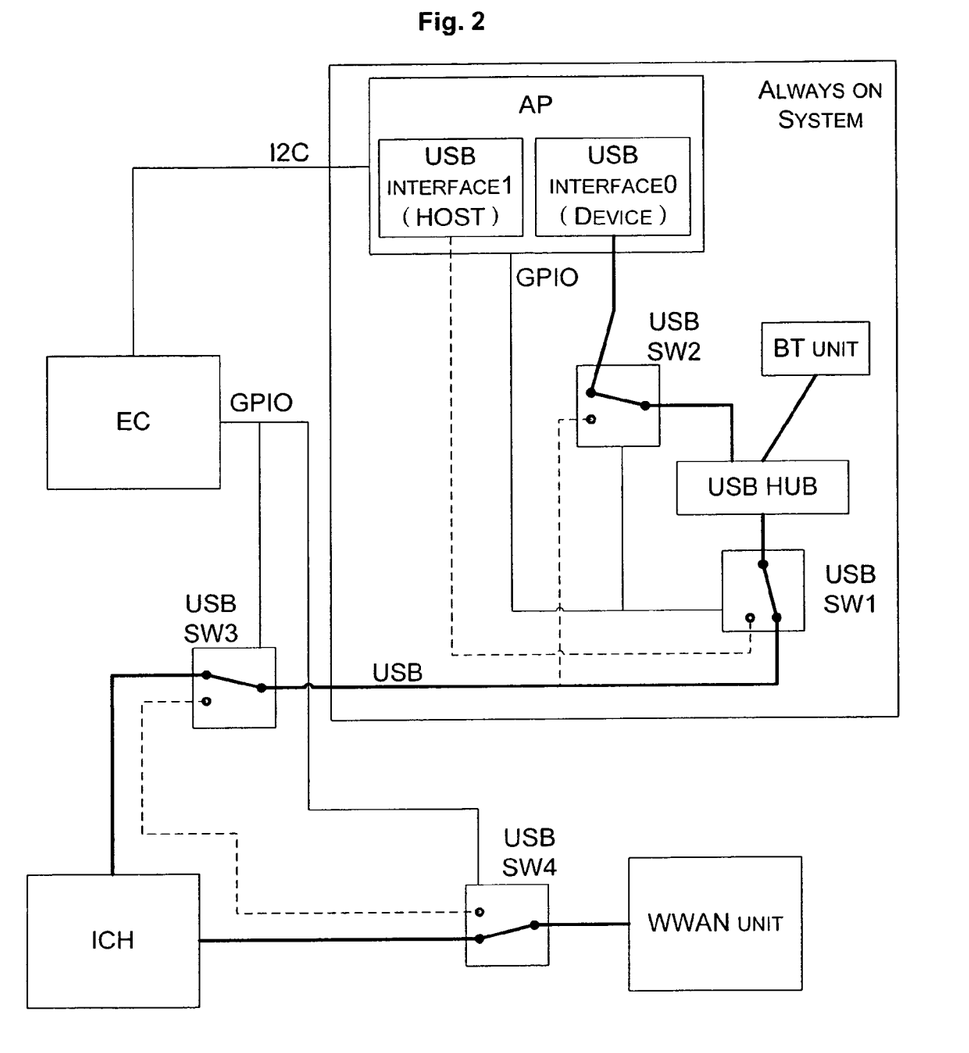
FIG. 2 is a diagram of the apparatus for achieving always online operation in the first switching state according to the second embodiment of the present invention.

Now referring to FIG. 2, a diagram of the apparatus for achieving always online operation in the first switching state is shown according to the second embodiment of the present invention. In FIG. 2, the AP comprises a USB interface1 as the interface of a primary device HOST, through which the AP can achieve the primary device communication including active operations. The AP further comprises a USB interface0 as the interface of a secondary device Device, through which the AP can achieve the secondary device communication including passive operation. Additionally, the computer has been switched to the on-work state. A USB HUB is connected among a USB SW1, a USB SW2, a BT unit and other components, for providing sufficient connection lines. Such a connection manner can also be applied in the subsequent FIG.

Figure 3:
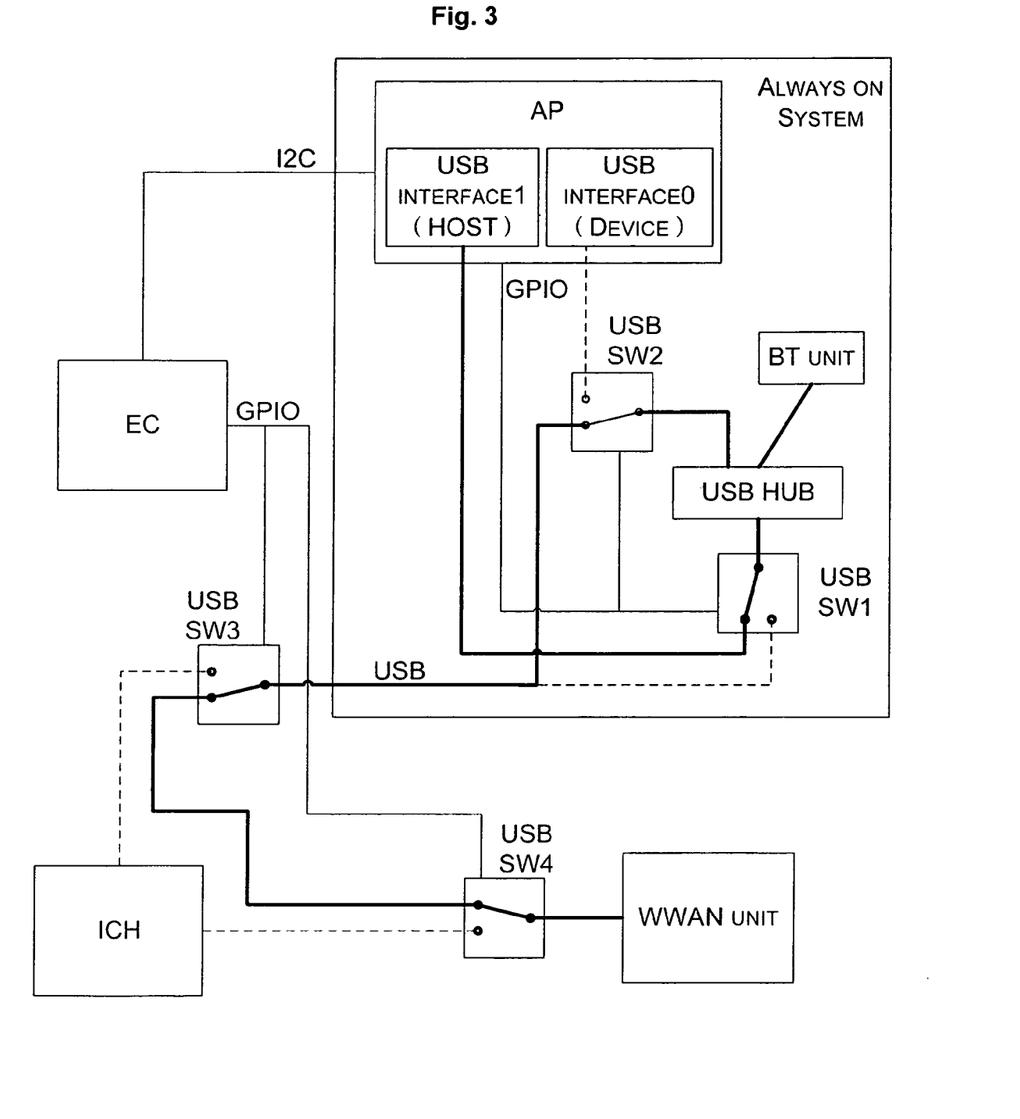
FIG. 3 is a diagram of the apparatus for achieving always online operation in the second switching state according to the second embodiment of the present invention.
Figure 4:
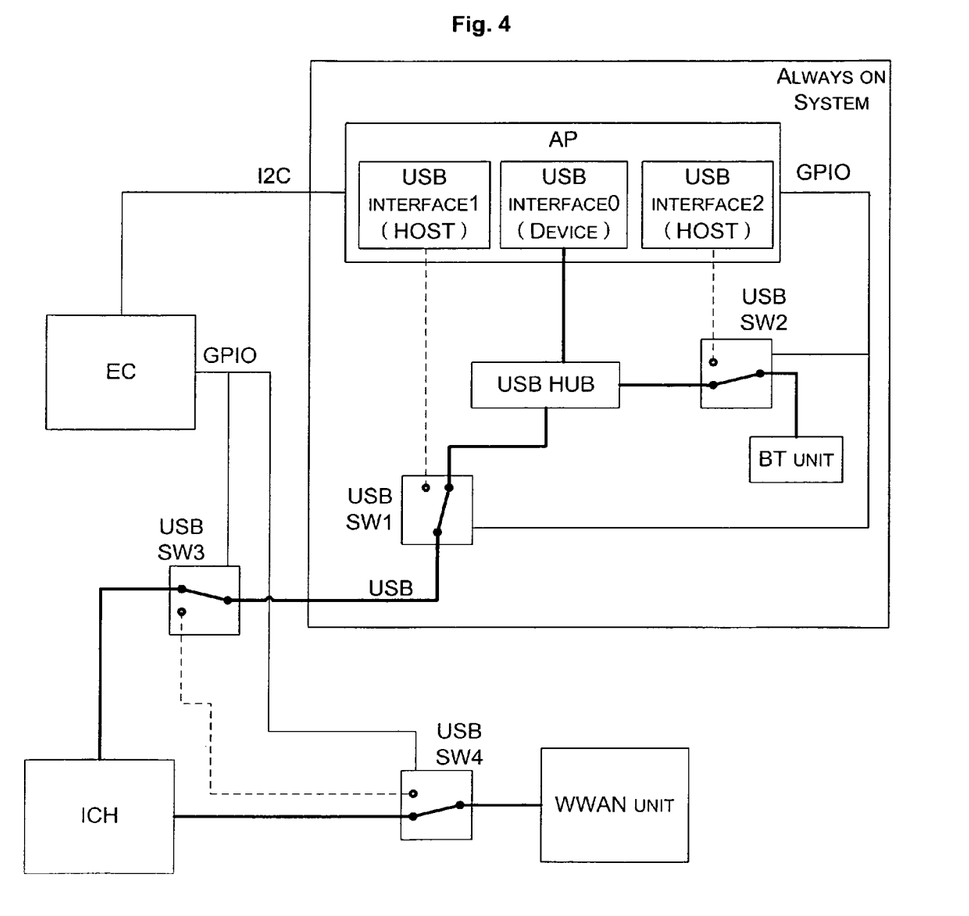
FIG. 4 is a diagram of the apparatus for achieving always online operation in the first switching state according to the third embodiment of the present invention.
Figure 5:
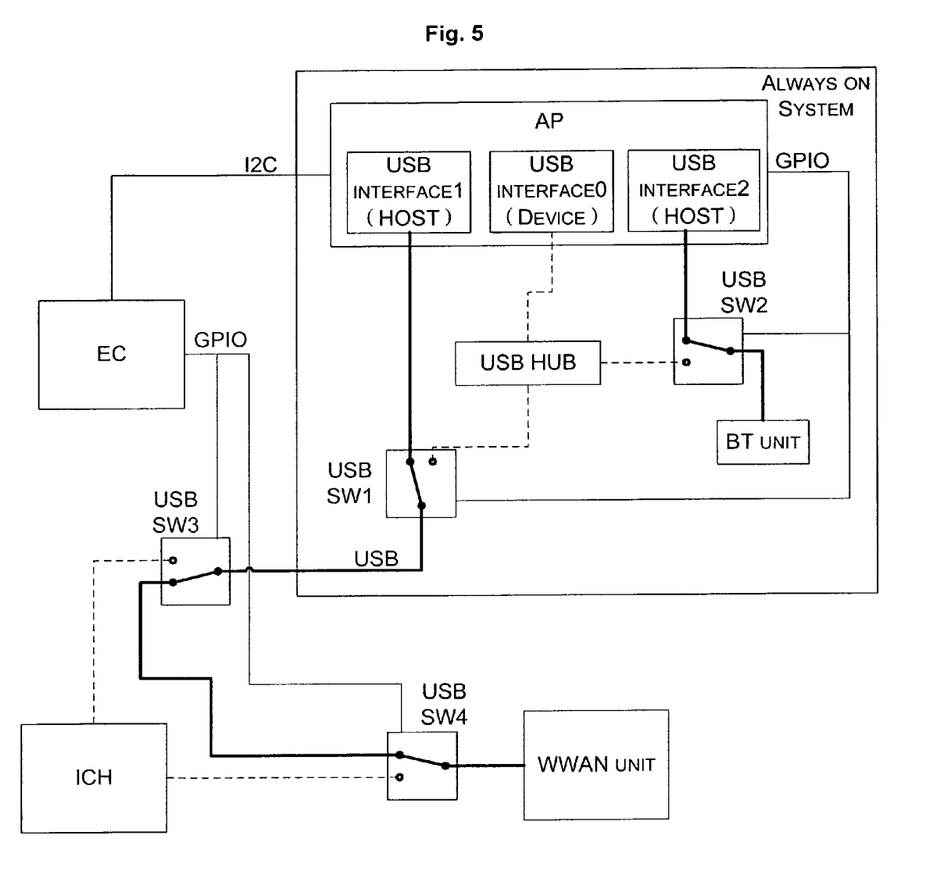
FIG. 5 is a diagram of the apparatus for achieving always online operation in the second switching state according to the third embodiment of the present invention.

3 to FIG. 5, in which the description for the USB HUB is omitted for the sake of simplicity.

In such a case, the EC can notify, via the GPIO interface, the online control switching unit, which comprises a USB SW3 and a USB SW4, to perform the switching of the online control. Based on the received notification, the USB SW3 and the USB SW4 then disconnect the path previously arranged into the open section of the primary device path between the AP and the online operation unit (the dash line between the USB SW3 and the USB SW4), and arrange the path of the open section into the section between the ICH and the online operation unit (the real line in bold between the ICH and the USB SW3, and the USB SW4, respectively). The EC also transmits an online control switching instruction to the AP via connections such as I2C. The AP confirms the lost of the ownership of the online control of the computer once receiving the online control switching instruction. Further, the AP notifies the USB switch unit, which comprises a USB SW1 and a USB SW2, to perform the switching of the online control via the GPIO interface. The USB SW1 and the USB SW2 then switches the primary device path previously connected from the AP to the online operation unit (led out from the USB interface1) to the secondary device path (led out from the USB interface0) based on the received notification.

As can be seen, after the operations described above, the ICH of the computer connects to the online operation unit and the AP via the real line in bold of FIG. 2. Therefore, the ICH can perform data operations, such as online operations, for the online operation unit and the AP.

Furthermore, since the AP leads out the path from the USB interface0, it can not apply any active operations on the online operation unit. Therefore, it has on impact on the online operations of the ICH.

Now referring to FIG. 3, a diagram of the apparatus for achieving always online operation in the second switching state is shown according to the second embodiment of the present invention. The difference between FIG. 3 and FIG. 2 is in that the computer is switched from the on-work state to the off-work state.

In such a case, the EC can notify, via the GPIO interface, the online control switching unit, which comprises a USB SW3 and a USB SW4, to perform the switching of the online control. Based on the received notification, the USB SW3 and the USB SW4 then disconnect the path previously connected from the online operation unit to the ICH (the dash line between the ICH and the USB SW3, and the USB SW4, respectively), and arranges the path into the open section of the primary device path between the AP and the online operation unit (the real line in bold between the USB SW3 and the USB SW4). The EC also transmits an online control switching instruction to the AP via connections such as I2C. The AP confirms its ownership of the online control of the computer once receiving the online control switching instruction. Further, the AP notifies the USB switch unit, which comprises a USB SW1 and a USB SW2, to perform the switching of the online control via the GPIO interface. The USB SW1 and the USB SW2 then switches the secondary device path previously connected from the AP to the online operation unit (led out from the USB interface0) to the primary device path (led out from the USB interface1) based on the received notification.

As can be seen, after the operations described above, the AP connects to the online operation unit via the USB interface1 and the real line in bold of FIG. 3. Therefore, the AP can perform data operations, such as online operations, for the online operation unit.

Furthermore, since there is open circuit between the ICH and the online operation unit, the ICH can not apply any active operations on the online operation unit. Therefore, it has no impact on the online operations of the AP.

Now referring to FIG. 4, a diagram of the apparatus for achieving always online operation in the first switching state is shown according to the third embodiment of the present invention. In FIG. 4, the AP comprises a USB interface1 and a USB interface2 as the primary device interfaces, through which the AP can achieve the primary device communication including active operations. The AP further comprises a USB interface0 as the secondary device interface, through which the AP can achieve the secondary device communication including passive operation. Additionally, the computer has been switched to the on-work state.

In such a case, the EC can notify, via the GPIO interface, the online control switching unit, which comprises a USB SW3 and a USB SW4, to perform the switching of the online control. Based on the received notification, the USB SW3 and the USB SW4 then disconnect the path previously arranged into the open section of the primary device path between the AP and the online operation unit (the dash line between the USB SW3 and the USB SW4), and arrange the path of the open section into the section between the ICH and the online operation unit (the real line in bold between the ICH and the USB SW3, and the USB SW4, respectively). The EC also transmits an online control switching instruction to the AP via connections such as I2C. The AP confirms the lost of the ownership of the online control of the computer once receiving the online control switching instruction. Further, the AP notifies the USB switch unit, which comprises a USB SW1 and a USB SW2, to perform the switching of the online control via the GPIO interface. The USB SW1 and the USB SW2 then switches the primary device path previously connected from the AP to the online operation unit (led out from the USB interface1 and the USB interface2) to the secondary device path (led out from the USB interface0) based on the received notification.

As can be seen, after the operations described above, the ICH of the computer connects to the online operation unit and the AP via the real line in bold of FIG. 2. Therefore, the ICH can perform data operations, such as online operations, for the online operation unit and the AP.

Furthermore, since the AP leads out the path from the USB interface0, it can not apply any active operations on the online operation unit. Therefore, it has on impact on the online operations of the ICH.

Now referring to FIG. 5, a diagram of the apparatus for achieving always online operation in the second switching state is shown according to the third embodiment of the present invention. The difference between FIG. 5 and FIG. 4 is in that the computer is switched from the on-work state to the off-work state.

In such a case, the EC can notify, via the GPIO interface, the online control switching unit, which comprises a USB SW3 and a USB SW4, to perform the switching of the online control. Based on the received notification, the USB SW3 and the USB SW4 then disconnect the path previously connected from the online operation unit to the ICH (the dash line between the ICH and the USB SW3, and the USB SW4, respectively), and arranges the path into the open section of the primary device path between the AP and the online operation unit (the real line in bold between the USB SW3 and the USB SW4). The EC also transmits an online control switching instruction to the AP via connections such as I2C. The AP confirms its ownership of the online control of the computer once receiving the online control switching instruction. Further, the AP notifies the USB switch unit, which comprises a USB SW1 and a USB SW2, to perform the switching of the online control via the GPIO interface. The USB SW1 and the USB SW2 then switches the secondary device path previously connected from the AP to the online operation unit (led out from the USB interface0) to the primary device path (led out from the USB interface1 and USB interface2) based on the received notification.

As can be seen, after the operations described above, the AP connects to the online operation unit via the USB interface1 and the USB interface2 and the real line in bold of FIG. 5. Therefore, the AP can perform data operations, such as online operations, for the online operation unit.

Furthermore, since there is open circuit between the ICH and the online operation unit, the ICH can not apply any active operations on the online operation unit. Therefore, it has no impact on the online operations of the AP.

Figure 6:
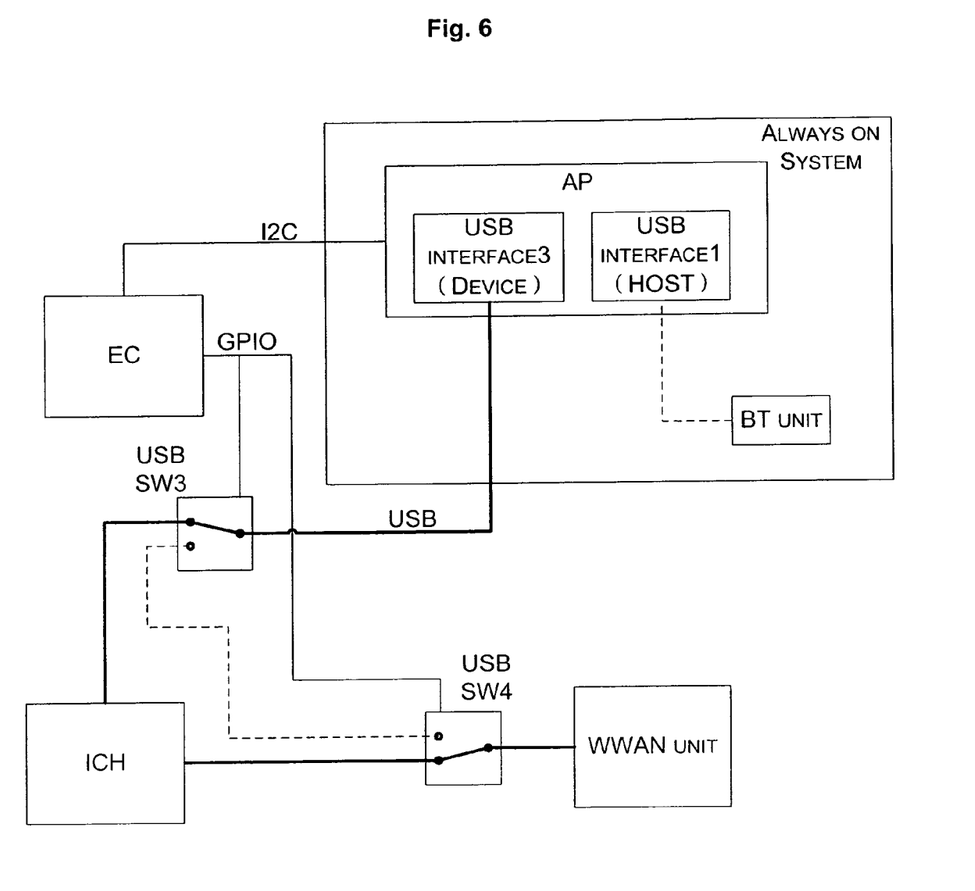
FIG. 6 is a diagram of the apparatus for achieving always online operation in the first switching state according to the fourth embodiment of the present invention.

Now referring to FIG. 6, a diagram of the apparatus for achieving always online operation in the first switching state is shown according to the fourth embodiment of the present invention. In FIG. 6, the AP comprises a USB interface1 as the primary device interface, through which the AP can achieve the primary device communication including active operations. The AP further comprises a USB interfaces as the primary/secondary device interface, through which the AP can achieve the primary device communication or the secondary device communication. The primary/secondary nature of the USB interface3 can be switched between the primary device interface and the secondary device interface (such as the communication interface supported by the widely used OTG technology) under the control of the AP. Additionally, the computer has been switched to the on-work state.

In such a case, the EC can notify, via the GPIO interface, the online control switching unit, which comprises a USB SW3 and a USB SW4, to perform the switching of the online control. Based on the received notification, the USB SW3 and the USB SW4 then disconnect the path previously arranged into the open section of the primary device path between the AP and the online operation unit (the dash line between the USB SW3 and the USB SW4), and arrange the path of the open section into the section between the ICH and the online operation unit (the real line in bold between the ICH and the USB SW3, and the USB SW4, respectively). The EC also transmits an online control switching instruction to the AP via connections such as I2C. The AP confirms the lost of the ownership of the online control of the computer once receiving the online control switching instruction. Further, the AP controls the USB interfaces connected to the online control switching unit, changes its interface state to the secondary interface, and confirms that the online operation unit connected to the USB interface1 is unavailable.

As can be seen, after the operations described above, the ICH of the computer connects to the WWAN unit in the online operation unit and the AP via the real line in bold of FIG. 6. Therefore, the ICH can perform data operations, such as online operations, for the online operation unit and the AP.

Furthermore, since the USB interfaces of the AP is a secondary device interface, along with the operation unit connected to the USB interface1 is confirmed to be unavailable, the AP can not apply any active operations on the online operation unit. Therefore, it has on impact on the online operations of the ICH.

Figure 7:
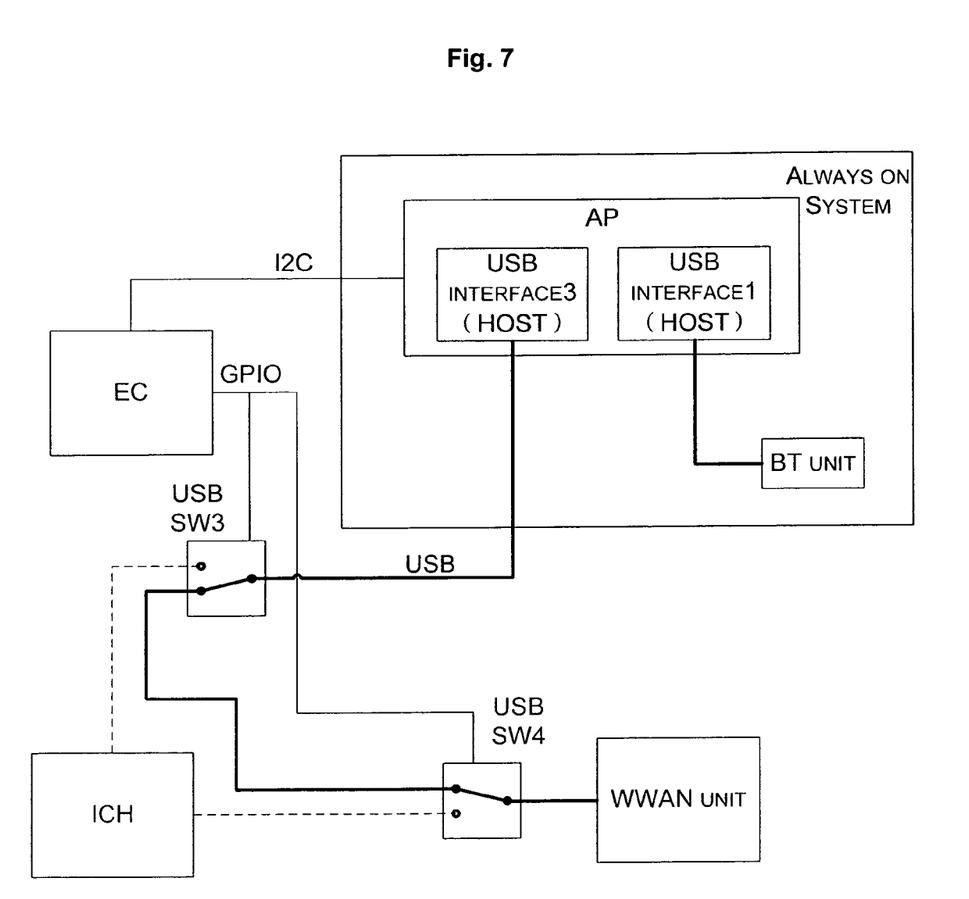
FIG. 7 is a diagram of the apparatus for achieving always online operation in the second switching state according to the fourth embodiment of the present invention.

Now referring to FIG. 7, a diagram of the apparatus for achieving always online operation in the second switching state is shown according to the fourth embodiment of the present invention. The difference between FIG. 5 and FIG. 4 is that the computer is switched from the on-work state to the off-work state.

In such a case, the EC can notify, via the GPIO interface, the online control switching unit, which comprises a USB SW3 and a USB SW4, to perform the switching of the online control. Based on the received notification, the USB SW3 and the USB SW4 then disconnect the path previously connected from the online operation unit to the ICH (the dash line between the ICH and the USB SW3, and the USB SW4, respectively), and arranges the path into the open section of the primary device path between the AP and the online operation unit (the real line in bold between the USB SW3 and the USB SW4). Further, the AP controls the USB interfaces connected to the online control switching unit, changes its interface state to the primary interface, and confirms that the online operation unit connected to the USB interface1 is available.

As can be seen, after the operations described above, since the USB interfaces of the AP is a primary device interface, along with the operation unit connected to the USB interface1 is confirmed to be available, the AP can perform data operations, such as active online operations, for the online operation unit.

Furthermore, since there is open circuit between the ICH and the online operation unit, the ICH can not apply any active operations on the online operation unit. Therefore, it has no impact on the online operations of the AP.

Figure 8:
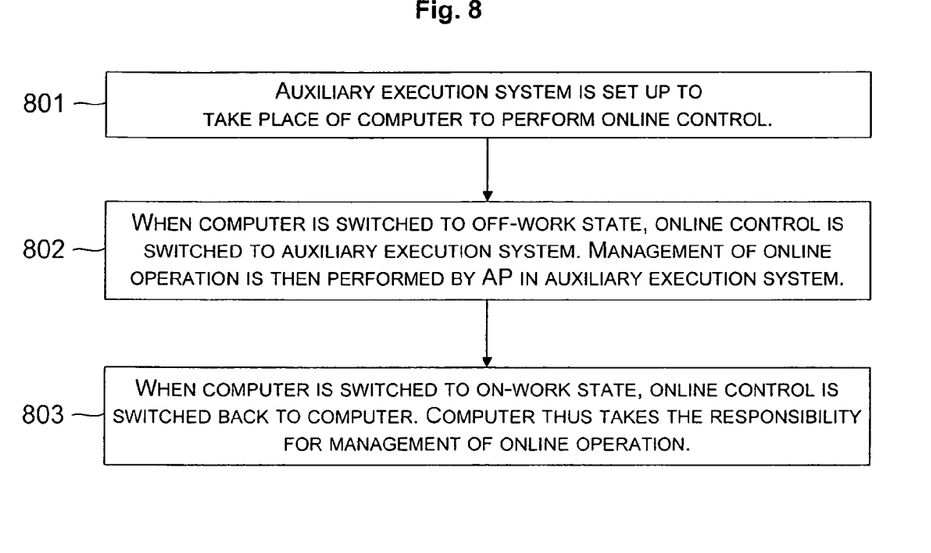
FIG. 8 is a flow chart showing the implementation of always online operation according to an embodiment of the present invention.

As can be seen from the drawings explained above, the operation process for achieving the always online can be described as the process in FIG. 8, which is a flow chart showing the implementation of always online operation according to an embodiment of the present invention. The process comprises the following steps.

In step 801, an auxiliary execution system is set up to take the place of the computer to perform the online control.

In step 802, the online control can be switched to the auxiliary execution system when the computer is switched from on-work state to off-work state. The management of the online operation is then performed by the AP in the auxiliary execution system.

In step 803, the online control can be switched back to the computer when the computer is switched from off-work state to on-work state. The computer thus takes the responsibility for the management of the online operation.

Figure 9:
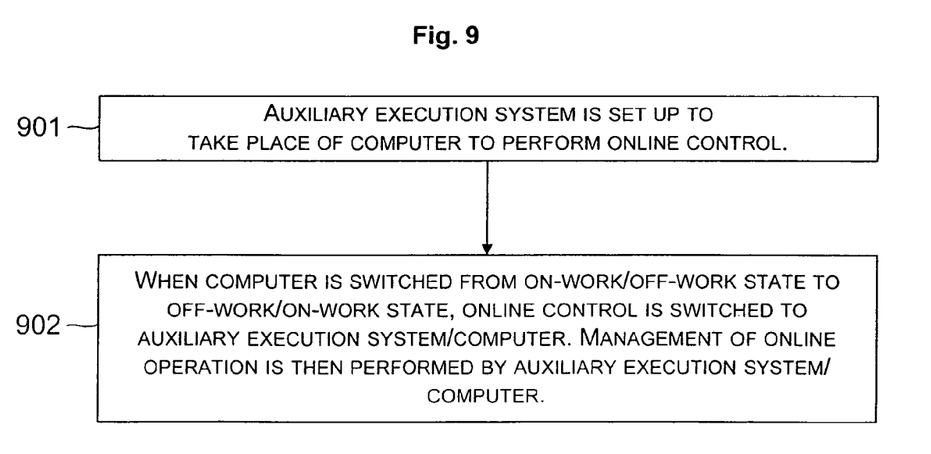
FIG. 9 is a simplified flow chart showing the implementation of always online operation according to the present invention.

As can be seen from the above description, the steps of the implementation of the always online can be summarized as FIG. 9. Now referring to FIG. 9, a simplified flow chart showing the implementation of always online operation is shown according to the present invention. The process comprises the following steps.

In step 901, an auxiliary execution system is set up to take the place of the computer to perform the online control.

In step 902, the online control can be switched to the auxiliary execution system/computer when the computer is switched from on-work/off-work state to off-work/on-work state. The management of the online operation is then performed by the auxiliary execution system/computer.

In practice, it is possible that the main execution system comprises the EC, the ICH, the two USB SWs (also referred to as a first USB SW and a second USB SW, respectively), the WWAN unit and the BT unit; the auxiliary execution system comprises the AP (comprising the USB interface1 as the primary device interface and the USB interface0 as the secondary device interface), the BT unit and the USB switch unit (comprising the USB interfaces which may be referred to as the third USB SW and the fourth USB SW).

In such a case, each of the USB SWs comprises a first interface, a second interface and a third interface. The first USB SW is connected to the WWAN unit via its first interface, to the ICH via its second interface and to the second interface of the second USB SW via its third interface. The second USB SW is connected to the ICH via its third interface and to the second interface of the third USB SW and the second interface of the fourth USB SW, respectively, via its first interface. The third USB SW is connected to the secondary device interface of the AP via its third interface and to the USB HUB via its first interface. The fourth USB SW is connected to the USB HUB via its first interface and to the primary device interface of the AP. The USB HUB is connected to the BT unit.

The EC is used to transmit an online control switching instruction to the AP when the computer is in the off-work state, in order to control to turn on the first interface and the third interface of the first USB SW and the first interface and the second interface of the second USB SW. The AP is used to control to turn on the first interface and the second interface of the third USB SW and the first interface and the third interface of the fourth USB SW when receiving the online control switching instruction.

Figure 10:
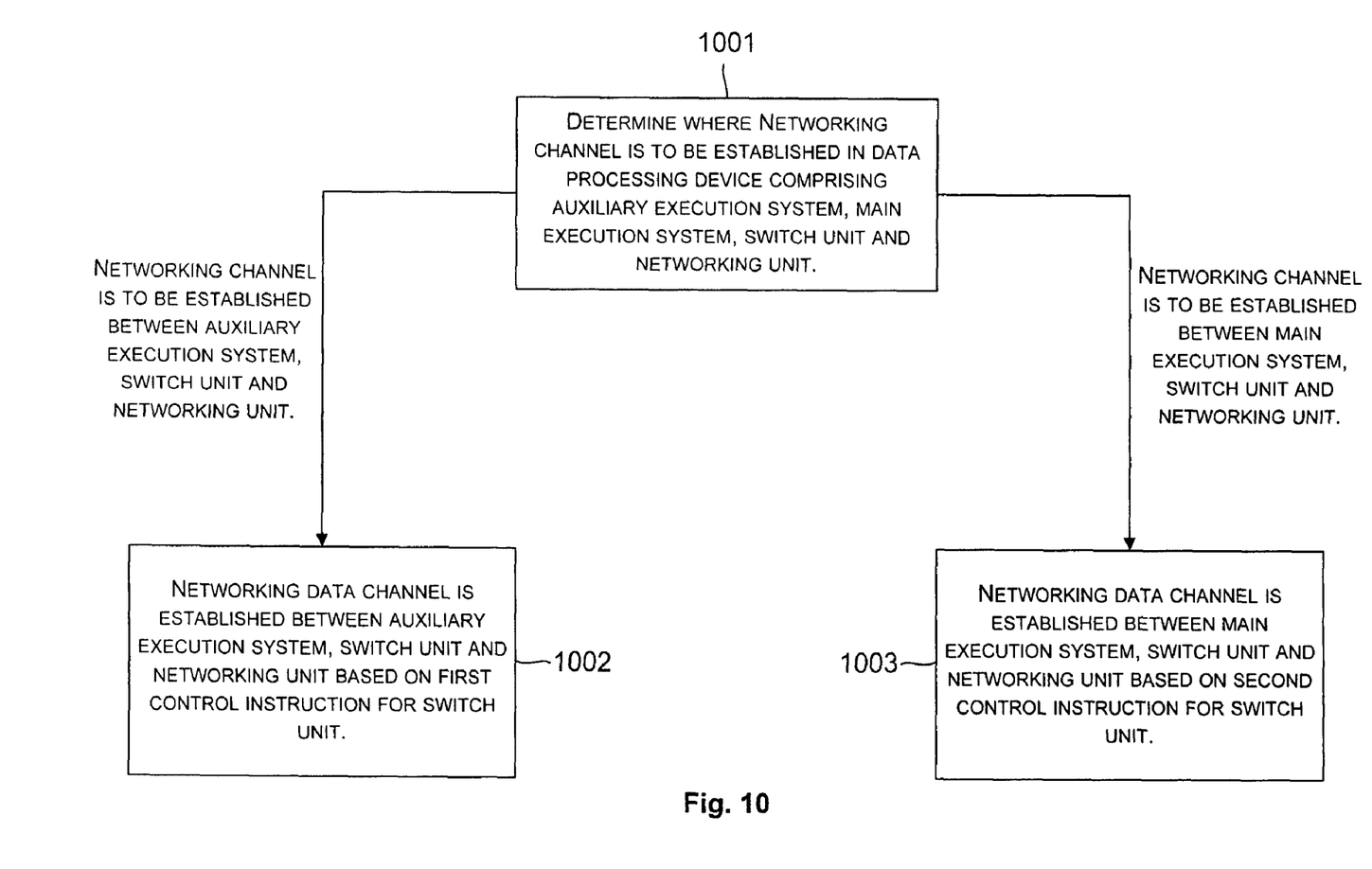
FIG. 10 is another simplified flow chart showing the implementation of always online operation according to the present invention.

From the above description, the critical steps of the embodiments of the present invention can be summarized as FIG. 10. Now referring to FIG. 10, another simplified flow chart showing the implementation of always online operation is shown according to the present invention. The process comprises the following steps.

In step 1001, it is determined where a networking channel is to be established in the data processing device comprising an auxiliary execution system, a main execution system, a switch unit and a networking unit.

If the networking channel is to be established between the auxiliary execution system, the switch unit and the networking unit, the process proceeds to step 1002. If the networking channel is to be established between the main execution system, the switch unit and the networking unit, the process proceeds directly to step 1003.

In step 1002, a networking data channel is established between the auxiliary execution system, the switch unit and the networking unit based on a first control instruction for the switch unit. The process is then terminated.

In step 1003, a networking data channel is established between the main execution system, the switch unit and the networking unit based on a second control instruction for the switch unit. The process is then terminated.

From the above description, a method and apparatus for data processing is provided for a data processing device comprising an auxiliary execution system, a main execution system, a switch unit and a networking unit. The method and apparatus according to the present invention are capable of establishing a networking data channel between the auxiliary execution system, the switch unit and the networking unit based on a first control instruction for the switch unit; or of establishing a networking data channel between the main execution system, the switch unit and the networking unit based on a second control instruction for the switch unit. In this way, the realization of always online can be guaranteed, and apparently, the user satisfaction can be effectively improved.

What is claimed is:

1. A method for data processing, used in a data processing device comprising an auxiliary execution system, a main execution system, a switch unit and a networking unit, comprising:

disconnecting, when a first networking data channel is established between the main execution system, the switch unit and the networking unit, the first networking data channel and establishing a second networking data channel between the auxiliary execution system, the switch unit and the networking unit based on a first control instruction for the switch unit;

establishing a networking data channel between the main execution system and the switch unit wherein establishing the second networking data channel between the auxiliary execution system, the switch unit and the networking unit based on the first control instruction for the switch unit comprises:

disconnecting a path between the networking unit and the main execution system, and arranging the path into an open section of a primary device path between the auxiliary execution system and the networking unit;

transmitting from the main execution system to the auxiliary execution system a online control switching instruction;

confirming, by the auxiliary execution system, the ownership of the online control of the main execution system once receiving the online control switching instruction; and switching, by the auxiliary execution system, a secondary device path between the auxiliary execution system and the networking unit, to the primary device path.

2. The method according to claim 1, wherein establishing the second networking data channel between the auxiliary execution system, the switch unit and the networking unit based on the first control instruction for the switch unit further comprises synchronizing a result of an online operation in the main execution system into the auxiliary execution system.

3. The method according to claim 1, further comprising:

disconnecting when the second networking data channel is established between the auxiliary execution system, the switch unit and the networking unit, the second network data channel and establishing the first networking data channel between the main execution system, the switch unit and the networking unit based on a second control instruction for the switch unit, wherein establishing the first networking data channel between the main execution system, the switch unit and the networking unit based on the second control instruction for the switch unit comprises:

disconnecting a path previously arranged into the open section of the primary device path and arranging the path into a section between the main execution system and the networking unit;

transmitting from the main execution system to the auxiliary execution system a online control switching instruction;

confirming, by the auxiliary execution system, loss of ownership of the online control of the main execution system once receiving the online control switching instruction; and switching, by the auxiliary execution system, the primary device path to the secondary device path.

4. The method according to claim 1, wherein establishing networking data channel between the main execution system, the switch unit and the networking unit based on the second control instruction for the switch unit further comprises synchronizing a result of an online operation in the auxiliary execution system into the main execution system.

5. An apparatus for data processing, comprising:
an auxiliary execution system;

a main execution system connected to the auxiliary execution system;

a switch unit connected to the main execution system and the auxiliary execution system, respectively; and a networking unit connected to the switch unit, by which the main execution system and the auxiliary execution system connect to a network, wherein the main execution system comprises an embedded controller EC connected to the networking unit and a south bridge chip ICH; the auxiliary execution system comprises an application processor AP and a universal serial bus USB switch unit, and wherein the EC is used to notify the switch unit to perform the switching of online control, and to transmit the online control switching instruction to the AP;

the switch unit is used to disconnect a path previously arranged into an open section of a primary device path between the AP and the networking unit, and arranging the path into a section between the ICH and the networking unit;

the AP is used to confirm loss of ownership of the online control of the main execution system once receiving the online control switching instruction, and to notify the USB switch unit to perform the switching of online control; and the USB switch unit is used to switch the primary device path to a secondary device path between the AP and the networking unit.

6. The apparatus according to claim 5, wherein the switch unit is further used to disconnect a path between the networking unit and the ICH, and arranging the path into an open section of the primary device path between the AP and the networking unit; and the USB switch unit is further used to switch the secondary device path to the primary device path.

7. The apparatus according to claim 6, wherein the AP comprises a USB interface1 as a primary device interface, and a USB interface0 as a secondary device interface, the primary device path being led out from the USB interface1, the secondary device path being led out from the USB interface0, and the USB switch unit comprises universal serial bus switch, USB SW1 and USB SW2, which are connected to each other; or the AP comprises a USB interface1 and a USB interface2 as primary device interfaces, and a USB interface0 as a secondary device interface, the primary device path being led out from the USB interface1 and the USB interface2, the secondary device path being led out from the USB interface0, and the USB switch unit comprises universal serial bus switch, USB SW1 and USB SW2, which are connected to each other; or the AP comprises a USB interface3 as a primary/secondary device interface, and a USB interface1 as a primary device interface, the primary device path being led out from the USB interface3 which serves as a primary device interface, the secondary device path being led out from the USB interface3 which serves as a secondary device interface, wherein the AP is further used to confirm an online operation unit connected via the USB interface1 to be unavailable when the USB interface3 serves as a secondary device interface, or to confirm an online operation unit connected via the USB interface1 to be available when the USB interface3 serves as a primary device interface.

8. The apparatus according to claim 6, wherein the networking unit comprises at least one of a wireless wide area network element and a Bluetooth element.

9. The apparatus according to claim 5, wherein the AP comprises a USB interface1 as a primary device interface, and a USB interface0 as a secondary device interface, the primary device path being led out from the USB interface1, the secondary device path being led out from the USB interface0, and the USB switch unit comprises universal serial bus switch, USB SW1 and USB SW2, which are connected to each other; or the AP comprises a USB interface1 and a USB interface2 as primary device interfaces, and a USB interface0 as a secondary device interface, the primary device path being led out from the USB interface1 and the USB interface2, the secondary device path being led out from the USB interface0, and the USB switch unit comprises universal serial bus switch, USB SW1 and USB SW2, which are connected to each other; or the AP comprises a USB interface3 as a primary/secondary device interface, and a USB interface1 as a primary device interface, the primary device path being led out from the USB interface3 which serves as a primary device interface, the secondary device path being led out from the USB interface3 which serves as a secondary device interface, wherein the AP is further used to confirm an online operation unit connected via the USB interface1 to be unavailable when the USB interface3 serves as a secondary device interface, or to confirm an online operation unit connected via the USB interface1 to be available when the USB interface3 serves as a primary device interface.

10. The apparatus according to claim 5, wherein the networking unit comprises at least one of a wireless wide area network element and a Bluetooth element.

* * * * *